United States Patent Office 3,580,714
Patented May 25, 1971

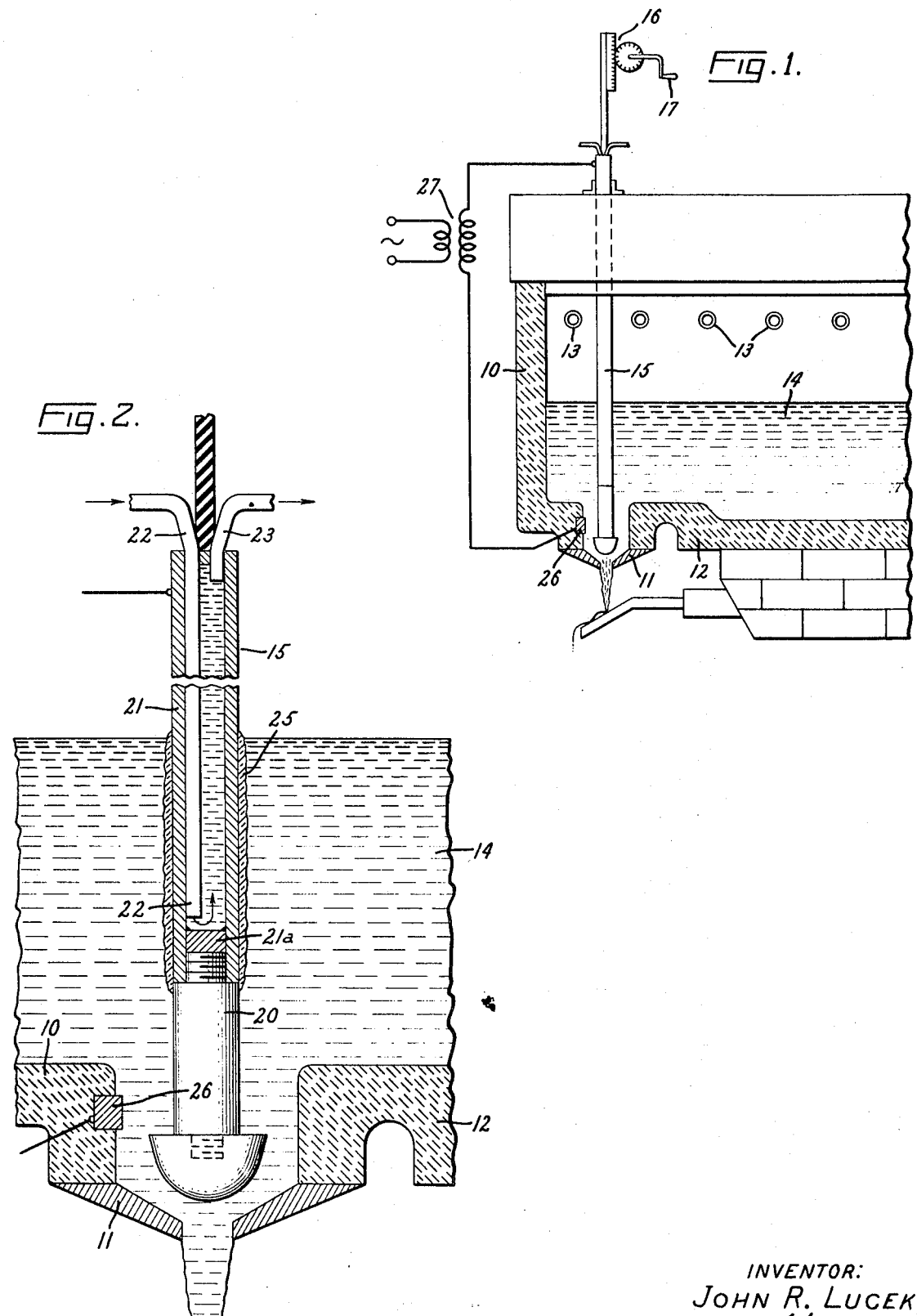

3,580,714
DISCHARGE CONTROL ELEMENT FOR GLASS-MELTING FURNACES
John R. Lucek, Pittsfield, Mass., assignor to General Electric Company
Filed Oct. 30, 1968, Ser. No. 771,853
Int. Cl. C03b 5/32
U.S. Cl. 65—330                                    4 Claims

ABSTRACT OF THE DISCLOSURE

The application discloses a discharge control element, such as a needle or plunger, for use in glass-melting furnaces. Such control elements, being movable or adjustable in operation, are adapted to be only partially immersed in molten glass with the immersed tip positioned adjacent a discharge orifice for control of stream-feeding or gob-feeding of the molten glass to utilization equipment. The tip of the rod is formed of a material substantially impervious to erosion in molten glass, and the shank portion of the rod is formed of a metal subject to rapid erosion in molten glass but resistant to oxidation in air. The shank portion is cooled to coat its immersed part with solid glass to protect it against erosion by the molten glass. As disclosed, a preferred form of discharge control element comprises a rod having a tubular shank portion of steel provided with passages for the circulation of cooling water, and a removable immersed tip or head portion formed of molybdenum.

---

DISCHARGE CONTROL ELEMENT FOR GLASS-MELTING FURNACES

My invention relates to discharge control elements for glass-melting furnaces, and more particularly to control needles or plungers adapted to be partially immersed in molten glass for control of the discharge orifice in stream-feeding or gob-feeding of glass from a furnace.

In glass-melting furnaces of the stream-feed and gob-feed type, the discharge bowl and orifice are located at the outer end of a channel-shaped extension of the furnace chamber containing a shallow pool of molten glass. Such an extending discharge section is known as a forehearth and is heated to maintain the shallow glass body therein in molten condition. Discharge of glass through the orifice is controlled by means of a movable rod, such as a plunger for gob-feeding or an adjustable needle for stream-feeding. Such control members usually have a very short useful life. Most metals are readily dissolved or otherwise eroded when immersed in molten glass. Those not readily eroded by molten glass are subject to rapid oxidation in air when maintained at very high temperature. Accordingly, it has been general practice to utilize ceramic materials for the control rods, i.e., orifice needles or plungers, in the forehearth section of glass furnaces.

Ceramic control elements operate satisfactorily in glass furnaces when initially placed in use. They do, however, have certain disadvantages. Such ceramic rods are expensive; they wear rapidly; they dissolve appreciably in molten glass, and they are subject to thermal shock. Ceramic rods tend to become brittle when exposed to thermal shock, and to deposit broken chips in the forehearth bowl. Accordingly, replacement of ceramic discharge control rods is a frequent and expensive procedure. The furnace must be taken out of operation and broken pieces of the ceramic rod cleaned out of the forehearth bowl before a new rod is placed in position.

Accordingly, it is a principal object of my invention to minimize maintenance and down time in the operation of glass furnace forehearths.

It is a more particular object of my invention to provide an improved discharge control rod or element for glass furnaces which has longer life and greater thermal shock resistance than the ceramic needles and plungers heretofore in use.

In carrying out my invention in one preferred embodiment, I provide in conjunction with a glass-melting furnace having a forehearth including a discharge orifice, a discharge control rod comprising a water-cooled shank of copper or steel and a removable tip formed of molybdenum. The molybdenum tip, adapted to be positioned adjacent the orifice, is only very slightly soluble in molten glass and is thus able to withstand immersion in the high temperature glass without undue erosion. The steel shank portion is partially immersed in the molten glass but is provided with sufficient cooling that the immersed part of the shank is below the freezing temperature of glass. The immersed part of the shank, therefore, is coated in operation with a layer of frozen glass and thus protected against attack and erosion by molten glass.

My invention will be more fully understood and its various objects and advantages further appreciated by referring now to the following detailed specification taken in conjunction with the accompanying drawing in which:

FIG. 1 is a vertical cross-sectional view of the forehearth chamber of a typical glass-melting furnace, showing the discharge bowl or spout provided with a control rod embodying my invention, and FIG. 2 is an enlarged axial cross-sectional view of my improved discharge control rod shown positioned in the forehearth discharge orifice as at FIG. 1.

Referring now to the drawing, I have shown at FIG. 1 a fragmentary cross-sectional view of a glass-melting furnace comprising particularly the forehearth chamber of the furnace terminating in a spout or a discharge bowl 10 having a conical orifice 11 in a lower wall thereof. A typical glass-melting furnace having such a forehearth chamber is shown, for example, in Patent 1,889,516—McIntosh. As illustrated at FIG. 1, the forehearth comprises a trough or channel 12 connecting the discharge bowl 10 to the body of the furnace, and in both the channel and bowl portions of the forehearth, heating means are provided for maintaining the glass in molten condition. At FIG. 1, such heating means is illustrated schematically as a group of gas jets 13 extending into the forehearth above the surface of the molten glass. At FIG. 1 there is illustrated a body of molten glass 14 having a surface above the discharge orifice 11 and exposed at the top to air.

For control of glass discharge from the orifice 11, I have shown a control element or needle 15 movably mounted in the upper wall of the forehearth chamber 10, 12 with its lower end or tip immersed in the glass body 14 adjacent the discharge orifice. In order to adjustably position the needle 15 with respect to the discharge orifice 11, I have illustrated schematically a rack and pinion mechanism 16 above the upper wall of the forehearth chamber, the pinion being actuated by a manually operable crank 17 to adjustably position the needle.

As more fully illustrated at FIG. 2, the control needle 15 comprises an immersed lower end or tip 20 in juxtaposition to the conical discharge orifice 11 and an elongated upper shank portion 21 which is partially immersed in the molten glass body 14 and extends above the surface of the glass. The control tip or head 20 of the needle 15 is preferably removable, as shown in the drawing. The head 20 is formed of any suitable material able to withstand the temperature of the molten glass without severe erosion or corrosion. Such materials, for example, may be molybdenum, rhodium, platinum or graphite. Preferably, I utilize molybdenum for the immersed head or tip 20. The shank portion 21 of the control needle 15 is formed as a hollow tube, preferably of ferrous alloys such as steel or other structurally strong metal, such as copper or a copper alloy, which is able to withstand, at least momentarily, immersion in the molten glass. The hollow shank 21 of the control needle is provided with cooling means shown as a substantially coextensive water inlet conduit 22 extending into the tube 21 from the top in colinear spaced-apart relation. The hollow shank 21 is closed at its lower end slightly beyond the end of the conduit 22, as by an integral or removable plug 21a tapped to receive the removable tip 20. A water outlet conduit 23 is provided from an upper portion of the tube 21, and the upper end of the tube is otherwise closed, thereby to form a closed circuit for the passage of cooling water. At FIG. 2, I have shown a coating 25 of frozen glass encircling the steel shank portion of the control needle in that region which is below the surface of the molten glass body 14.

In the operation of my improved control needle, the cooling fluid circulated through the conduits 22, 23 and the shank portion 21 of needle 15 is so regulated that the shank of the needle, partly immersed in molten glass, is maintained at an external surface temperature below the freezing point of the glass, thereby to form on the shank a protective coating 25 of solid glass. In one embodiment of the invention which has been built and successfully operated, the immersed part of the shank was maintained at a temperature of about 50° C. It will, of course, be understood by those skilled in the art that the control tip 20 of the needle 15 must be allowed to operate at or near the temperature of the molten glass, so that no coating of frozen glass accumulates thereon to impede its orifice control action. In the experimental embodiment of the needle structure described above, I have found that such a needle may be continued in operation without change or other maintenance for a period approximately 40 times as long as ceramic needles heretofore in use.

To illustrate another advantageous feature of my metallic control needle having a molybdenum tip, I have shown at FIGS. 1 and 2 an electrode 26 mounted in the wall of the forehearth adjacent the discharge orifice 11 and connected through a power supply transformer 27 to a source of electric current supply, the other side of which is connected to the control needle 15. In this manner electric current passed between the tip of the needle and the electrode 26 may be utilized to supply supplemental heat to the molten glass body and thus maintain the molten glass at a desired temperature in the immediate region of the discharge orifice.

It will, of course, be understood by those skilled in the art that while I have disclosed my invention as applied particularly to a control needle for a discharge orifice of the stream-feed type, it is equally applicable to reciprocable plungers of the type utilized for gob-feeding of glass from orifices of suitable configuration.

While I have shown and described a preferred embodiment of my invention by way of illustration, many modifications will occur to those skilled in the art, and I therefore wish to have it understood that I intend in the appended claims to cover all such modifications as fall within the true spirit and scope of my invention.

What I claim as new and desire to secure by Letters Patent of the United States is:

1. A glass-melting furnace comprising, a chamber adapted to contain a body of molten glass of predetermined minimum depth, said chamber being provided with a discharge orifice positioned below the surface of said glass body, a discharge control rod movably mounted in said chamber above the surface of said glass body and having a tip positioned adjacent said orifice, said rod including a shank portion extending above and below the surface of said glass body, said tip being formed of material substantially impervious to erosion in molten glass and being positioned entirely below the lowest surface level of said glass body, the shank portion of said rod being formed of a metal subject to rapid erosion in molten glass but resistant to oxidation in air, and cooling means for maintaining at least the immersed part of said shank portion at a temperature below the melting point of said glass, thereby to coat the immersed part of said shank with solid glass and to protect it against erosion by said molten glass body.

2. A furnace according to claim 1 wherein the tip of said discharge control rod is formed of a material selected from the class comprising platinum, rhodium, molybdenum and graphite and the shank portion of said rod is formed of a material selected from the class comprising ferrous alloys, cuprous alloys and copper.

3. A furnace according to claim 1 wherein the tip of said discharge control rod is formed of molybdenum and the shank portion of said rod is formed of steel, said shank portion being provided with an internal passage adapted to conduct a cooling fluid.

4. A furnace according to claim 2 wherein the shank portion of said discharge control rod comprises a hollow tube closed at both ends and a substantially coextensive fluid inlet conduit positioned therein in colinear spaced-apart relation.

References Cited

UNITED STATES PATENTS

| | | | |
|---|---|---|---|
| 1,696,661 | 12/1928 | Willetts | 65—362 |
| 1,888,963 | 11/1932 | Peiler | 65—355X |
| 1,889,516 | 11/1932 | McIntosh | 65—355X |
| 3,157,482 | 11/1964 | Nero et al. | 65—374X |
| 3,316,074 | 4/1967 | Laurent et al. | 75—171X |
| 3,351,449 | 11/1967 | Ambrogi | 65—122 |

S. LEON BASHORE, Primary Examiner

S. R. FRIEDMAN, Assistant Examiner

U.S. Cl. X.R.

65—355, 362, 374

Disclaimer 3,580,714.—*John R. Lucek*, Pittsfield, Mass. DISCHARGE CONTROL ELEMENT FOR GLASS-MELTING FURNACES. Patent dated May 25, 1971. Disclaimer filed Feb. 19, 1971, by the assignee, *General Electric Company*.

Hereby disclaims the portion of the term of the patent subsequent to Nov. 10, 1987.

[*Official Gazette November 23, 1971.*]